United States Patent Office 3,002,931
Patented Oct. 3, 1961

3,002,931
COMPOSITIONS CONTAINING TRICHLOROCYANURIC ACID
William F. Symes, Winchester, Mass., assignor to Monsanto Chemical Company, St. Louis, Mo., a corporation of Delaware
No Drawing. Filed Nov. 19, 1956, Ser. No. 622,737
13 Claims. (Cl. 252—99)

The present invention relates to compositions comprising trichlorocyanuric acid and alkaline alkali metal salts, and relates particularly to compositions of these ingredients which have improved resistance to loss of available chlorine in the presence of moisture and can be used for bleaching, disinfecting, sterilizing, detergent and other purposes.

Dry or substantially dry compositions consisting essentially of trichlorocyanuric acid and alkaline alkali metal salts such as alkaline alkali metal phosphates and/or combinations of these with wetting agents and/or synthetic detergents such as, for example, sodium salts of long chain alkyl sulfates and sodium salts of alkylated benzene sulfonic acids are described in U.S. Patent No. 2,607,738 to Edgar E. Hardy, issued August 19, 1952. As is pointed out in this patent the compositions or mixtures are quite stable when dry and may be stored for long periods of time. However, it has since been found that when such compositions contain even small amounts of moisture whether by accidental contamination or otherwise or by addition to water, the trichlorocyanuric acid tends to decompose and the compositions tend to lose available chlorine at a relatively rapid rate initially. This means that the moisture contaminated compositions contain less available chlorine than would be expected on the basis of the trichlorocyanuric acid initially present therein and consequently, under such circumstances, the compositions are usually deficient in available chlorine for the general purpose for which they were initially formulated. Contamination of the compositions with moisture may occur by mixing the ingredients in the presence of moisture without taking precautions to keep the ingredients in the dry state, or by storing the compositions, in home laundries for instance, in open containers or in containers which are not sufficiently tight to exclude moisture. Loss of available chlorine is also experienced if the compositions are added to water to form aqueous solutions which are left to stand for some period of time before use. Since the compositions may become contaminated by moisture in various ways with resultant loss in available chlorine when handled by consumers who take little or no precautions in excluding moisture from the compositions, there is a definite need for compositions of the type described in which the loss of available chlorine is retarded, or which do not exhibit undue loss of available chlorine, when exposed to moisture.

It is, accordingly, one object of this invention to provide compositions containing trichlorocyanuric acid and alkaline alkali metal salts, which compositions have improved stability toward loss of available chlorine in the presence of moisture.

It is a further object of this invention to provide a composition comprising trichlorocyanuric acid and alkaline alkali metal phosphate salts, which composition is capable of releasing available chlorine in aqueous solutions for bleaching, sanitizing and other purposes and which exhibits improved stability toward loss of available chlorine during storage in the presence of moisture.

It is a further object of this invention to provide a composition comprising trichlorocyanuric acid and alkali metal carbonates, which compositions have improved stability toward loss of available chlorine in the substantially anhydrous state as well as in the presence of moisture.

Still further objects and advantages of this invention will become apparent from the following description and appended claims.

The present invention is based on the discovery that compositions comprising trichlorocyanuric acid and alkaline, water-soluble, alkali metal salts retain their original available chlorine content to a marked degree in the presence of moisture when they contain aryl sulfonamides such as, for example, benzene sulfonamide. This discovery is applicable to compositions containing in excess of 0.5% by weight of moisture, but is particularly applicable to solid and free-flowing compositions containing in excess of 1% by weight of moisture, as well as aqueous slurries or solutions of such compositions.

The trichlorocyanuric acid employed in the compositions of this invention has been described in the literature and has been referred to as possibly existing in the keto- and enol forms. In any event, the compound has a theoretical available chlorine content of 91.5%. The commercially available product containing between about 84 and 91.5% available chlorine can also be used. The term "available chlorine" as employed herein is used in its usual technical meaning as employed in the sodium hypochlorite art. The "available chlorine" in a given compound is determined by analyzing for the amount of chlorine that can be liberated from the compound by treatment with an aqueous acid solution.

A variety of alkaline, water-soluble, alkali metal salts can be used in the compositions of this invention, including, preferably, those inorganic salts which are employed as detergent builders. As examples of such salts may be mentioned tri-alkali metal phosphates such as trisodium phosphate and tripotassium phosphate; di-alkali metal hydrogen phosphates such as disodium hydrogen phosphate and dipotassium hydrogen phosphate; the alkaline, water-soluble molecularly dehydrated alkali metal phosphate salts such as the alkali metal pyrophosphates, for example, tetrasodium pyrophosphate, trisodium hydrogen pyrophosphate and tetrapotassium pyrophosphate, also the alkali metal tripolyphosphates such as sodium tripolyphosphate ($Na_5P_3O_{10}$) and potassium tripolyphosphate; the alkaline, water-soluble alkali metal meta phosphates such as sodium hexametaphosphate; the water-soluble alkali metal silicates such as sodium silicates having an $Na_2O$ to $SiO_2$ mol ratio of 1.5:1 to 1:3.6, preferably 1:1 to 1:3.5, and the corresponding potassium silicates; the water-soluble alkali metal borates such as calcined sodium tetraborate or borax; and the water-soluble alkali metal carbonates or bicarbonates such as sodium or potassium carbonates. The above salts can be used alone or in various combinations with each other or with water-soluble, neutral, inert diluents, which may also have some detergent building properties, for example, water-soluble, neutral, inert, inorganic alkali metal salt diluents such as neutral alkali metal sulfates or chlorides, for example, sodium sulfate or sodium chloride. The proportions of salts employed in the compositions of this invention can be varied considerably depending on the end use of the composition, but is usually in excess of 40% and up to 96% by weight of the dry solids content of the composition. Of this, the alkaline alkali metal salts usually comprise about 10 to 95% by weight of total salts, and the inert diluent salt usually is used in amounts of about 90 to 5% by weight of total salts.

Although the compositions of this invention consist essentially of trichlorocyanuric acid, an aryl sulfonamide and the alkaline salts or combination thereof with inert diluent salts hereinbefore referred to, the compositions can also contain relatively minor amounts, usually less than 15% by weight on a solids basis, preferably 1 to 10% by weight, of anionic wetting agents or synthetic detergents such as those described in the above-mentioned Hardy Patent No. 2,607,738. Such agents or detergents include organic surface active sulfonates or sulfates having a hydrophobe and hydrophile portion, the latter being a sulfate or sulfonate group, for example, sodium salts of long chain alkyl sulfates, sodium salts of alkyl naphthalene sulfonic acids, sodium salts of alkyl benzene sulfonic acids, particularly those in which the alkyl group contains 8 to 16 carbon atoms, sodium salts of sulfonated mineral oils; and sodium salts of sulfosuccinic esters as sodium dioctylsulfosuccinate.

The various ingredients referred to herein can be used in the compositions in various proportions depending on whether the composition is to be used as a bleaching composition, a disinfecting composition, a dishwashing composition, a detergent composition, etc. However, in general, the compositions will contain, on a dry basis, from about 0.5 to 40% by weight of trichlorocyanuric acid, about 0.1 to 3, preferably 0.3 to 1.5, mols of aryl sulfonamide per mol of trichlorocyanuric acid, from 0.05 to 10% by weight of anionic wetting agent, when used, and the remainder consisting substantially of alkaline alkali metal salts or combinations thereof with the inert diluent salts, and moisture, usually in amounts of 0.5 to 5% by weight. In the case of aqueous compositions, the ingredients are normally present in the composition on the same solids basis as given above, but the compositions may contain from 50 to 99% by weight of water. The amount of a particular or specific aryl sulfonamide required in the above compositions will vary to a considerable extent within the ranges described above depending on the particular aryl sulfonamide used, the specific alkaline alkali metal salt present in the composition, the amount of moisture present in the composition and the storage conditions employed, and this will be specified in greater detail in the descripiton following the specific examples.

In a preferred embodiment of the invention, the compositions comprise, on a solids basis, from about 3 to 15% by weight of trichlorocyanuric acid, about 0.3 to 1.2 mol of benzene sulfonamide per mol of trichlorocyanuric acid, about 10 to 60% by weight of sodium tripolyphosphate or a mixture of such phosphate and sodium silicate, and the remainder consisting substantially of sodium sulfate. Such compositions are useful as commercial laundry bleaches and dishwashing compositions.

In another preferred embodiment of the invention, the compositions comprise, on a solids basis, about 3 to 15% by weight of trichlorocyanuric acid, about 0.3 to 1.2 mols of benzene sulfonamide per mol of trichlorocyanuric acid, about 10 to 60% by weight of sodium tripolyphosphate, about 0.1 to 5% by weight of anionic wetting agent, preferably sodium dodecyl benzene sulfonate, and the remainder consisting substantially of sodium sulfate. Such compositions are useful as household bleaches and sanitizers.

In still another preferred embodiment of the invention, the compositions comprise from about 3 to 15% by weight of trichlorocyanuric acid, from about 0.4 to 1.4 mols of benzene sulfonamide per mol of trichlorocyanuric acid, and the remainder consisting substantially of sodium carbonate or mixtures thereof with sodium tripolyphosphate. These compositions are useful as sanitizer detergents, particularly in cleaning and sanitizing food processing equipment and containers.

In most instances, the proportions and kind of ingredients in the formulation employed will depend on the purpose for which the formulation or composition is being used, that is, whether it is to be used for bleaching, sanitizing, dishwashing, etc. Irrespective of the use involved, however, the compositions containing the aryl sulfonamides in the proper proportions have a definitely greater tendency to retain their original available chlorine content in the presence of moisture than corresponding compositions which do not contain the aryl sulfonamide.

A further understanding of the compositions of this invention will be obtained from the following specific examples which are intended to illustrate the invention but not to limit the scope thereof, parts and percentages being by weight unless otherwise indicated.

Example 1

Dry mixed compositions containing the following ingredients in the percentage given were prepared:

| Ingredient | Composition No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Trichlorocyanuric Acid | 11 | 11 | 11 | 11 | 11 | 11 | 11 | 11 | 11 | 11 | 11 | 11 |
| Benzene Sulfonamide | 0 | 0 | 0 | 0 | 0 | 0 | 7 | 7 | 7 | 7 | 7 | 7 |
| Sodium Tripolyphosphate | 30 | 20 | 0 | 0 | 20 | 0 | 30 | 20 | 0 | 0 | 20 | 0 |
| Tetrasodium Pyrophosphate | 0 | 0 | 30 | 20 | 0 | 0 | 0 | 0 | 30 | 20 | 0 | 0 |
| Anhydrous Sodium Metasilicate | 0 | 0 | 0 | 0 | 20 | 0 | 0 | 0 | 0 | 0 | 20 | 0 |
| Anhydrous Sodium Sulfate | 59 | 69 | 59 | 69 | 49 | 0 | 52 | 62 | 52 | 62 | 42 | 0 |
| Sodium Carbonate | 0 | 0 | 0 | 0 | 0 | 89 | 0 | 0 | 0 | 0 | 0 | 82 |

All of the compositions had substantially the same odor characteristics, namely only a slight chlorine odor, in the dry state in sealed containers. When compositions 1–12 contained 1% by weight of moisture, compositions 1–6 exhibited a stronger chlorine odor than compositions 7–12 after storage in sealed containers indicating some decomposition of the trichlorocyanuric acid due to the presence of small amounts of moisture in contrast to a lack of decomposition in compositions 7–12. When compositions 1–12 were slurried with water to form 50% solids slurries or concentrated solutions, the resulting aqueous products from compositions 1–6 exhibited a strong chlorine odor, whereas the resulting aqueous products from compositions 7–12 had a mild chlorine odor or were odorless.

All of the foregoing comparisons indicate that moisture tends to decompose compositions containing trichlorocyanuric acid and alkaline salts, whereas this decomposition is suppressed or inhibited or retarded when benzene sulfonamide is present in the compositions.

Example 2

The compositions described in the following table were prepared by thoroughly mixing the ingredients specified in the dry state, and the available chlorine content of each composition was determined, after which the compositions were stored for 13 hours in sealed vials at 60° C. and the available chlorine content was again determined with the following results:

| Composition No. | Trichlorocyanuric Acid, parts | Sodium Carbonate, parts | Benzene Sulfonamide, parts | Loss in Available Chlorine, percent of Initial |
|---|---|---|---|---|
| 13 | 0.2 | 2 | 0 | 21.3 |
| 14 | 0.2 | 2 | 0.01 | 20.8 |
| 15 | 0.2 | 2 | 0.02 | 16.4 |
| 16 | 0.2 | 2 | 0.03 | 15.3 |
| 17 | 0.2 | 2 | 0.04 | 10.0 |
| 18 | 0.2 | 2 | 0.06 | 7.0 |
| 19 | 0.2 | 2 | 0.08 | 2.4 |
| 20 | 0.2 | 2 | 0.10 | 1.3 |
| 21 | 0.2 | 2 | 0.15 | 0.8 |

The above results clearly indicate that benzene sulfonamide retards the loss of available chlorine from the compositions under very adverse storage conditions, with the most effective results being obtained by using about 0.6 to 1.1 mols of benzene sulfonamide per mol of trichlorocyanuric acid (compositions 1921).

Example 3

The compositions described in the following table were prepared by thoroughly mixing anhydrous sodium tripolyphosphate to which 2% of $H_2O$ had been added with the other ingredients specified which were in the dry state. The available chlorine content of each composition was immediately determined, after which the compositions were stored for 16 hours in sealed vials at 60° C. and the available chlorine content was again determined with the following results:

| Composition No. | Trichloro-cyanuric Acid, parts | Sodium Tripoly-phosphate, parts | Benzene Sulfonam-ide, parts | Loss in Available Chlorine, percent of Initial |
|---|---|---|---|---|
| 22 | 0.2 | 4 | 0 | 11.0 |
| 23 | 0.2 | 4 | 0.025 | 3.1 |
| 24 | 0.2 | 4 | 0.05 | 1.9 |
| 25 | 0.2 | 4 | 0.075 | 1.3 |
| 26 | 0.2 | 4 | 0.10 | 1.9 |

The above results clearly indicate that benzene sulfonamide retards the loss of available chlorine from compositions of sodium tripolyphosphate and trichlorocyanuric acid and as low as 1.8%, based on the composition, of water, under very adverse storage conditions. Very effective results are obtained as indicated in the above table by using as little as 0.18 mol of benzene sulfonamide per mol of trichlorocyanuric acid (composition 23).

Example 4

The compositions described in the following table were prepared by thoroughly mixing the ingredients specified in the dry state, and the available chlorine content of each composition was then determined, after which the compositions were stored for 16 hours in sealed vials at 60° C. and the available chlorine content of each composition was again determined with the following results:

| Composition No. | Trichloro-cyanuric Acid, parts | Sodium Carbonate, parts | P-Toluene Sulfonam-ide, parts | Loss in Available Chlorine, percent of Initial |
|---|---|---|---|---|
| 27 | 0.2 | 2 | 0 | 19.3 |
| 28 | 0.2 | 2 | 0.01 | 16.8 |
| 29 | 0.2 | 2 | 0.02 | 15.5 |
| 30 | 0.2 | 2 | 0.03 | 10.5 |
| 31 | 0.2 | 2 | 0.04 | 7.9 |
| 32 | 0.2 | 2 | 0.05 | 12.5 |
| 33 | 0.2 | 2 | 0.07 | 22.1 |

The above results clearly indicate that p-toluene sulfonamide at certain concentrations retards the loss of available chlorine from the above compositions under very adverse storage conditions, with the most effective results being obtained by using about 0.2 to 0.35 mol of p-toluene sulfonamide per mol of trichlorocyanuric acid (compositions 30–32). However, if the mol ratio of p-toluene sulfonamide to trichlorocyanuric acid is appreciably greater than 0.35 to 1 an adverse effect is noted. A comparison of the results of this example and Example 2, indicates that benzene sulfonamide and p-toluene sulfonamide are not equivalent in the results produced in a dry composition composed of it, trichlorocyanuric acid and sodium carbonate. Thus, benzene sulfonamide is more effective than p-toluene sulfonamide on a mol for mol basis. Also, the use of increasing amounts of benzene sulfonamide gives an optimum value of retardation of available chlorine loss without adverse effect, whereas the use of increasing amounts of p-toluene sulfonamide give an optimum retardation which is rapidly followed by an adverse effect.

Example 5

The following compositions were prepared, the amounts of ingredients employed being in parts by weight unless otherwise indicated, and the available chlorine of each composition was determined. The compositions were then allowed to stand for 60 hours at room temperature and the available chlorine content of each composition was again determined with the following results:

| Composition No. | Trichlor-o-cya-nuric Acid | Sodium Tripoly-phos-phate | Sodium Sul-fate | P-Tolu-ene Sul-fonam-ide | Water | Loss in Available Chlorine, percent of Initial |
|---|---|---|---|---|---|---|
| 34 | 0.2 | 0 | 0 | 0 | 2.5 | 41.2 |
| 35 | 0.2 | 1 | 1.2 | 0 | 2.5 | 44.0 |
| 36 | 0.2 | 1 | 1.2 | 0.05 | 2.5 | 23.0 |
| 37 | 0.2 | 1 | 1.2 | 0.0735 | 2.5 | 22.3 |
| 38 | 0.2 | 1 | 1.2 | 0.147 | 2.5 | 11.0 |
| 39 | 0.2 | 1 | 1.2 | 0.294 | 2.5 | 9.2 |

The above results clearly indicate that p-toluene sulfonamide retards the loss of available chlorine from aqueous slurries of the type described, with the most effective results being obtained by using from 1–2 mols of p-toluene sulfonamide per mol of trichlorocyanuric acid (compositions 38 and 39). In contrast to Example 4 in which increasing amounts of p-toluene sulfonamide gave adverse results in dry compositions of trichlorocyanuric acid and sodium carbonate, increasing amounts of p-toluene sulfonamide give beneficial results in the compositions described in the above table. In the compositions described in the above table both p-toluene sulfonamide and benzene sulfonamide give analogous results.

Although the invention described herein has been described primarily with reference to the use of benzene sulfonamide and p-toluene sulfonamide, other aryl sulfonamides having the sulfamyl radical ($NH_2$—$SO_2$—) can be used instead of benzene sulfonamide and p-toluene sulfonamide to retard the loss of available chlorine from compositions comprising trichlorocyanuric acid and water-soluble, alkaline alkali metal salts of the type described. A preferred class of aryl sulfonamides is composed of those compounds having the structural formula:

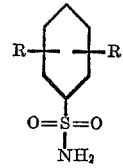

where R is selected from hydrogen, halogen, preferably chlorine, and alkyl radicals, preferably alkyl radicals containing from 1 to 10 carbon atoms. As examples of compounds which fall within the scope of the above structural formula and which can be used in the compositions of this invention may be mentioned benzene sulfonamide, monochlor benzene sulfonamide, p-toluene sulfonamide, m-toluene sulfonamide, xylene sulfonamide and the like.

However, it has presently been found that benzene sulfonamide is more effective and desirable for most purposes than other aryl sulfonamides which fall within the scope of the above formula. Thus, as can be seen from a comparison of Examples 2 and 4, benzene sulfonamide is not only more effective than p-toluene sulfonamide on a mol for mol basis in retarding the loss of available chlorine from dry compositions of trichlorocyanuric acid and sodium carbonate under very adverse conditions of storage, but also can be used in increasing amounts to further retard the loss of available chlorine without producing the adverse effects obtained by using increasing amounts of p-toluene sulfonamide. Also, benzene sulfonamide is superior for the reasons given above to other alkyl substituted benzene sulfonamides which fall within the scope of the above formula. Although the superiority of benzene sulfonamide over other aryl sulfonamides falling within the scope of the above formula is not as great in retarding loss of available chlorine from aqueous slurries or solutions containing trichlorocyanuric acid and the water-soluble alkaline alkali metal salt as in the case of dry compositions of trichlorocyanuric acid and sodium carbonate under adverse storage conditions, benzene sulfonamide still is preferred for use in such slurries or solutions since it is in general more effective than other aryl sulfonamides on a mol for mol basis.

As has been pointed out in the previous description the amount of aryl sulfonamide required to effectively retard the loss of available chlorine from the compositions will vary depending upon the particular aryl sulfonamide and alkaline salts, the amount of water present and the storage conditions employed. In general, compositions containing alkali metal carbonates exhibit a more rapid initial loss of available chlorine than compositions containing other alkaline salts and therefore often require the use of larger amounts of the aryl sulfonamide to retard this loss of available chlorine. Also, in those instances where the storage conditions or conditions of use are usually severe or adverse (for example, high temperatures or high humidity or both), it may be necessary to use larger amounts of the above-described aryl sulfonamides. Further, the amount of moisture present in the compositions has some effect on the amount of aryl sulfonamide required. In general, when the compositions contain above 0.5% by weight of water, but less water than is required to form solutions or slurries less aryl sulfonamide is usually required to effectively retard loss of available chlorine than in the case of aqueous solutions or slurries of such compositions. In general, the most suitable amounts of a particular aryl sulfonamide to be used in the compositions have previously been described herein but it will be understood that such amounts can be varied in view of the above factors and in the light of the following description.

In general, the amount of aryl sulfonamides required is very similar for all aryl sulfonamides within the ranges hereinbefore given with the exception of any compositions consisting essentially of trichlorocyanuric acid, an alkali metal carbonate and an aryl sulfonamide. In these compositions, the behavior of benzene sulfonamide and benzene sulfonamides having halogen-substituted on the benzene nucleus is quite different from p-toluene sulfonamides or the alkyl substituted benzene sulfonamides in which the alkyl substituent is attached to the benzene nucleus. In the case of the first-mentioned sulfonamides the retardation of loss of available chlorine is increased to an optimum value with the use of increasing amounts of such sulfonamide, and the use of further amounts of such sulfonamide usually has no further effect on retardation of loss of available chlorine and has no effect on the composition except perhaps from a cost standpoint. On the other hand, the use of increasing amounts of p-toluene sulfonamides and the alkyl substituted benzene sulfonamides results in an optimum retardation value followed by a loss of retardation effect and an ultimate loss of available chlorine in excess of that obtained when such sulfonamide is omitted from the composition. Hence, in the case of dry compositions consisting essentially of trichlorocyanuric acid, alkali metal carbonates and p-toluene sulfonamides or alkyl substituted benzene sulfonamides in which the alkyl radical is attached to the benzene nucleus, it is usually necessary to employ from 0.2 to 0.35, preferably 0.25 to 0.35, mol of such sulfonamide per mol of trichlorocyanuric acid in order to obtain optimum retardation of loss of available chlorine without adverse effect on the composition properties.

The compositions of this invention can be prepared in a variety of ways. Thus, the ingredients can be, and preferably are, mixed as solid particles to provide a mixture, preferably a uniform mixture, of solid particles, usually in the form of a free-flowing mixture. However, the ingredients can be mixed to form a mixture of solid particles and then formed into briquettes or tablets or otherwise compressed in the form of cakes, cubes, etc. The ingredients can also be dissolved or slurried in water and sold as aqueous solutions or slurries, or these solutions or slurries can be dried, for example, by drum drying to obtain flakes which can be used and sold as such or ground to powder form for use and sale. The aqueous solutions or slurries can be spray dried, if desired, to form beads or hollow spheres which can be used or sold in such form.

What is claimed is:

1. A solid bleaching, disinfecting, sterilizing and detergent composition consisting essentially of (1) from about 0.5 to 40% by weight of trichlorocyanuric acid, (2) from about 0.1 to 3 mols, per mol of trichlorocyanuric acid, of an aryl sulfonamide, and (3) a water soluble salt selected from the group consisting of inorganic, alkaline, water-soluble, alkali metal detergent builder salts and mixtures thereof with a water-soluble inert inorganic neutral alkali metal salt and (4) from 0.5 to about 5.0% by weight of water, said aryl sulfonamide being sufficient to retard loss of available chlorine from said composition in the presence of said water.

2. A solid composition as in claim 1, but further characterized in that the alkaline water-soluble salt is an alkali metal phosphate.

3. A solid composition as in claim 1, but further characterized in that the water-soluble alkaline salt is sodium carbonate and in that the aryl sulfonamide is benzene sulfonamide.

4. A solid composition as in claim 2, but further characterized in that the phosphate is sodium tripolyphosphate and that the aryl sulfonamide is benzene sulfonamide.

5. A solid, bleaching, disinfecting, sterilizing and detergent composition consisting essentially of (1) from about 0.5 to about 40% by weight of trichlorocyanuric acid, (2) from about 0.05 to about 10% by weight of an anionic wetting agent, (3) from about 0.1 to 3 mols, per mol of trichlorocyanuric acid, of an aryl sulfonamide having the sulfamyl radical and (4) a water-soluble salt selected from the group consisting of inorganic alkaline, water-soluble alkali metal detergent builder salts and mixtures thereof with a water-soluble inert inorganic neutral alkali metal salt and (5) from 0.5% to about 5.0% by weight of water, said aryl sulfonamide being sufficient to retard loss of available chlorine from said composition in the presence of said water.

6. A solid bleaching, disinfecting, sterilizing and detergent composition consisting essentially of (1) from about 0.5 to 40% by weight of trichlorocyanuric acid, (2) from about 0.05 to 10% by weight of an anionic wetting agent, (3) about 0.3 to 1.5 mols, per mol of trichlorocyanuric acid, of benzene sulfonamide, and (4) a water-soluble salt selected from the group consisting of inorganic, water-soluble, alkaline alkali metal detergent builder salts and mixtures thereof with a water-soluble, neutral alkali, metal salt, and (5) from 0.5% to about 5.0% by weight of water, said benzene sulfonamide being sufficient to retard loss of available chlorine from said composition in the presence of said water.

7. A solid bleaching, disinfecting, sterilizing and detergent composition consisting essentially of, on a solids basis, (1) from about 3 to 15% by weight of trichlorocyanuric acid, (2) about 0.3 to 1.2 mols, per mol of trichlorocyanuric acid, of benzene sulfonamide, (3) about 10 to 60% by weight of sodium tripolyphosphate, (4) from 0.5% to 5.0% by weight of water and the remainder consisting essentially of sodium sulfate; said benzene sulfonamide being sufficient to retard loss of available chlorine in the presence of said water.

8. A solid bleaching, disinfecting, sterilizing and detergent composition consisting essentially of, on a solids basis, (1) from about 3 to 15% by weight of trichlorocyanuric acid, (2) about 0.3 to 1.2 mols, per mol of trichlorocyanuric acid, of benzene sulfonamide, (3) about 10 to 60% by weight of sodium tripolyphosphate and sodium silicate, (4) from 0.5% to about 5.0% by weight of water and the remainder consisting essentially of sodium sulfate, said benzene sulfonamide being sufficient to retard loss of available chlorine from said composition in the presence of said water.

9. A solid bleaching, disinfecting, sterilizing and detergent composition consisting essentially of, on a solids basis, from about 3 to 15% by weight of trichlorocyanuric acid, from about 0.4 to 1.4 mols, per mol of trichlorocyanuric acid, of an aryl sulfonamide having the structural formula:

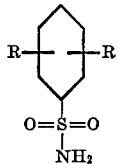

where R is selected from the group consisting of hydrogen, alkyl radicals and halogen, and the remainder consisting essentially of sodium carbonate and from 0.5% to about 5.0% by weight of water, said aryl sulfonamide being sufficient to retard loss of available chlorine from said composition in the presence of said water.

10. A solid composition as in claim 9, but further characterized in that said aryl sulfonamide is benzene sulfonamide.

11. A solid bleaching, disinfecting, sterilizing and detergent composition consisting essentially of (1) from about 0.5 to 40% by weight of trichlorocyanuric acid, (2) an inorganic, water-soluble, alkaline, alkali metal detergent builder salt, (3) from 0.5% to about 5.0% by weight of water and (4) an aryl sulfonamide in an amount sufficient to retard loss of available chlorine from said composition in the presence of said water.

12. A solid bleaching, disinfecting, sterilizing and detergent composition consisting essentially of (1) from about 0.5 to 40% by weight of trichlorocyanuric acid, (2) an inorganic, water-soluble, alkaline, alkali metal detergent builder salt, (3) from 0.5% to 5.0% by weight of water, and an aryl sulfonamide having the following formula:

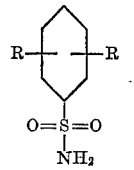

where R is selected from the group consisting of hydrogen, alkyl radicals and halogen, said aryl sulfonamide being present in an amount sufficient to retard loss of available chlorine from said composition in the presence of said water.

13. A solid composition as in claim 12, but further characterized in that said aryl sulfonamide is benzene sulfonamide.

References Cited in the file of this patent

UNITED STATES PATENTS

| | | |
|---|---|---|
| 1,650,124 | Gunzler et al. | Nov. 22, 1927 |
| 2,155,914 | Van der Lee | Apr. 25, 1939 |
| 2,427,097 | Kamlet et al. | Sept. 9, 1947 |
| 2,430,233 | Magill | Nov. 4, 1947 |
| 2,438,781 | Kamlet | Mar. 30, 1948 |
| 2,578,270 | Strain | Dec. 11, 1951 |
| 2,607,738 | Hardy | Aug. 19, 1952 |
| 2,689,225 | Anderson et al. | Sept. 14, 1954 |

OTHER REFERENCES

Chloramine-T Tablets, p. 2 and Table II, pub. by Monsanto Chemical Works, St. Louis (1923).